United States Patent
Honig et al.

(10) Patent No.: US 10,861,655 B2
(45) Date of Patent: Dec. 8, 2020

(54) METHOD FOR PRODUCING A CONTACT MATERIAL ON THE BASIS OF SILVER-TIN OXIDE OR SILVER-ZINC OXIDE, AND CONTACT MATERIAL

(71) Applicant: Doduco Contacts and Refining GmbH, Pforzheim (DE)

(72) Inventors: Thomas Honig, Pforzheim (DE); Volker Behrens, Bretten (DE); Havva Cinaroglu, Wiernsheim (DE)

(73) Assignee: DODUCO CONTACTS AND REFINING GMBH, Pforzheim (DE)

( * ) Notice: Subject to any disclaimer, the term of this patent is extended or adjusted under 35 U.S.C. 154(b) by 83 days.

(21) Appl. No.: 16/132,373

(22) Filed: Sep. 15, 2018

(65) Prior Publication Data
US 2019/0035563 A1    Jan. 31, 2019

Related U.S. Application Data

(63) Continuation of application No. PCT/EP2017/055997, filed on Mar. 14, 2017.

(51) Int. Cl.
*H01H 1/0237* (2006.01)
*C22C 32/00* (2006.01)
*C01G 19/02* (2006.01)

(52) U.S. Cl.
CPC ......... *H01H 1/02376* (2013.01); *C01G 19/02* (2013.01); *C22C 32/0021* (2013.01); *H01H 1/02372* (2013.01)

(58) Field of Classification Search
None
See application file for complete search history.

(56) References Cited

U.S. PATENT DOCUMENTS 5,822,674 A    10/1998 Behrens et al.
5,846,288 A    12/1998 Jost et al.

FOREIGN PATENT DOCUMENTS

| CN | 101964260 A | * | 2/2011 |
| CN | 101964260 A |   | 2/2011 |
| CN | 102268583 B | * | 6/2013 |
| DE | 43 31 526 A1 |  | 3/1994 |
| DE | 198 28 692 A1 |  | 1/1999 |

OTHER PUBLICATIONS

Espacenet machine translation of CN101964260 retrieved on Jan. 29, 2020 (Year: 2011).*

* cited by examiner

*Primary Examiner* — Keith D. Hendricks
*Assistant Examiner* — Joshua S Carpenter
(74) *Attorney, Agent, or Firm* — Hackler Daghighian Martino & Novak

(57) ABSTRACT

A method for producing a contact material on the basis of silver-tin oxide or silver-zinc oxide is disclosed. Tin oxide particles and/or zinc oxide particles are mixed with a powder of a metal different from silver. The mixture is heated beyond the melting point of the metal powder such that the tin oxide particles and/or zinc oxide particles are wetted with liquid metal. The mixture is exposed to an atmosphere containing oxygen and the metal is thereby oxidized. Thereafter, the mixture product formed by the oxidation step is embedded as a powder into a silver matrix. The product further relates to a corresponding contact material.

11 Claims, No Drawings

METHOD FOR PRODUCING A CONTACT MATERIAL ON THE BASIS OF SILVER-TIN OXIDE OR SILVER-ZINC OXIDE, AND CONTACT MATERIAL

CROSS-REFERENCE TO RELATED APPLICATIONS

This continuation application claims priority to PCT/EP2017/055997 filed on Mar. 14, 2017 which has published as WO 2017/162486 A1 and also the German application number 10 2016 105 437.2 filed on Mar. 23, 2016, the entire contents of which are fully incorporated herein with these references.

DESCRIPTION

Field of the Invention

The invention relates to a method for producing a contact material based on silver-tin oxide or silver-zinc oxide, as well as a corresponding contact material.

Background of the Invention

Contact materials based on silver tin oxide and methods for producing them are known from DE 43 31 526 C2 as well as from DE 198 28 692 A1, for example.

Electrical contacts are exposed to substantial stresses by electric arcs which form upon switching. An arc of this type causes the material of the contact to melt locally and partially vaporize; this is known as burn-off. Contact materials have to be permanently capable of tolerating these stresses as well as possible.

Contact materials based on silver tin oxide have good properties in this regard, because the silver matrix provides good electrical and thermal conductivity, while the tin oxide particles reduce burn-off. However, because of its higher thermal resistance, tin oxide has a tendency to form poorly conducting layers of slag at the contact surface under the action of arcs, resulting in an unsatisfactory heating behaviour under continuous current conditions. This disadvantage can be countered by mixing further metal oxides in with the contact material, for example tungsten, molybdenum, bismuth, vanadium and/or copper oxide. These additives help to wet tin oxide particles so that when the surface of a contact part melts locally under the action of the switch arc, the tin oxide remains finely dispersed in suspension.

The already not entirely satisfactory plastic deformability of contact materials based on silver tin oxide is deteriorated even further by these additives, however, because they cause embrittlement. This is particularly the case with bismuth oxide and molybdenum oxide.

SUMMARY OF THE INVENTION

An object of the present invention is to indicate a manner in which a contact material can be produced which combines good mechanical properties even better with advantageous heating behaviour and a high burn-off resistance.

This object is achieved by means of a method with the features listed in claim 1. Further advantageous embodiments of the invention are the subject matter of the dependent claims.

DETAILED DESCRIPTION OF THE PREFERRED EMBODIMENTS

In a method in accordance with the invention, tin oxide and/or zinc oxide powder is mixed with a powder of a metal that differs from silver, which may be an element or an alloy, for example with bismuth powder. This mixture is then heated beyond the melting point of the metal powder so that the tin oxide or zinc oxide particles are wetted with liquid metal. By means of the action of an oxygen-containing atmosphere, for example air, the metal wetting the tin oxide or zinc oxide particles is then oxidized. In this manner, metal oxide particles are formed which are highly intimately bonded with the grains of tin oxide or zinc oxide powder.

The tin oxide or zinc oxide particles may be coated with liquid metal by using a method in accordance with the invention. By oxidizing this metal, the tin oxide or zinc oxide particles are coated with a metal oxide and extremely well bonded therewith. The tin oxide or zinc oxide particles and the metal oxide may form a composite oxide. Furthermore, the quantity of the metal used does not necessarily have to be so great that all of the tin oxide or zinc oxides particles are completely coated.

The quantity of metal powder can be kept small because the metal oxide formed from the metal powder after melting is bound very strongly to the tin oxide or zinc oxide. As an example, the mass of the metal oxide may be less than one tenth of the mass of tin oxide and/or zinc oxide, approximately 2% to 5%.

Particularly when the quantity of metal powder with respect to the quantity of tin and zinc oxide powder is relatively small, the composite oxide produced by applying a method in accordance with the invention can be obtained directly as a powder, or it can be powdered with little effort. This composite oxide powder is then embedded in a silver matrix, for example by mixing the composite oxide powder with silver powder and then sintering the powder mixture.

The silver matrix herein may consist of pure silver, for example, or it may contain other metallic additives, for example copper. Preferably, the metallic silver matrix consists of more than 85% by weight of silver.

The metal powder used in the method in accordance with the invention for the production of metal oxide may, for example, be bismuth, tungsten, molybdenum and/or vanadium powder. The composite oxide powder produced in accordance with the invention may be mixed with further oxide powders.

In an advantageous further embodiment of the invention, the oxidation step is carried out at a raised temperature, for example at 600° C. or higher, in particular at 800° C. or higher. Many metals, such as bismuth, for example, either do not oxidize at room temperature or only oxidize very slowly.

In a further advantageous embodiment of the invention, the composite oxide formed from tin oxide or zinc oxide and metal oxide formed by the oxidation step is annealed at a higher temperature, for example at 1000° C. or higher. In this manner, a mixed oxide can be formed locally at the boundary between the tin oxide or zinc oxide particles and the adjacent metal oxide particles, and so the composite is still further improved.

Exemplary Embodiment 100 parts by weight of tin oxide powder with a particle size of less than 7 μm according to FSSS (FSSS=Fisher Sub-Sieve Sizer), for example, and 5 parts by weight of bismuth powder were mixed together. This powder mixture was then heated so that liquid bismuth wetted the tin oxide particles. Heating could be carried out under vacuum or in an inert gas atmosphere. Next, the mixture was exposed to an oxygen-containing atmosphere, for example air, and then annealed for one hour at a temperature of 1000° C., so that the bismuth oxidized. After oxidation was complete, the composite oxide produced underwent a further heat treatment, for example annealing for one hour or longer at 1100° C. or higher.

The oxide material formed in this manner was then pulverized and mixed with silver powder. The silver powder could then be melted, and in this manner the oxide could be embedded in a silver matrix. The oxides could, however, also be embedded in the silver matrix by sintering and/or extrusion. The material produced in accordance with the invention was more malleable compared with conventionally produced materials and had equivalent switch properties.

What is claimed is:

1. A method for the production of a contact material based on silver tin oxide or silver zinc oxide, the method comprising the steps of:
    forming a mixture by mixing particles of tin oxide and/or zinc oxide with a powder of a metal that differs from silver;
    heating this mixture beyond the melting point of the metal powder, wherein the tin oxide and/or zinc oxide particles are wetted with liquid metal;
    exposing the mixture to an oxygen-containing atmosphere thereby oxidizing the metal; and
    embedding the mixture formed by the oxidation step as a powder in a silver matrix.

2. The method as claimed in claim 1, wherein the metal powder contains bismuth as the main component.

3. The method as claimed in claim 2, wherein the oxidation step is carried out at a raised temperature of at least 600° C.

4. The method as claimed in claim 1, wherein the oxidation step is carried out at a raised temperature of at least 600° C.

5. The method as claimed in claim 1, wherein the mixture formed by the oxidation step undergoes a heat treatment at a raised temperature of at least 1000° C.

6. The method as claimed in claim 1, wherein embedding the mixture powder into the silver matrix is carried out by mixing the mixture powder with a silver powder and subsequently sintering both the mixture powder and the silver powder.

7. A contact material produced using the method as claimed in claim 1.

8. A method for the production of a contact material based on silver tin oxide or silver zinc oxide, the method comprising the steps of:
    forming a first mixture by mixing particles of tin oxide and/or zinc oxide with a powder of a metal that differs from silver;
    heating this first mixture beyond the melting point of the metal powder, wherein the tin oxide and/or zinc oxide particles are wetted with liquid metal;
    exposing the first mixture to an oxygen-containing atmosphere thereby oxidizing the metal to form a metal oxide;
    pulverizing the first mixture into a first mixture powder;
    forming a second mixture by mixing the first mixture powder with a silver powder; and
    heating the second mixture thereby embedding the first mixture in a silver matrix.

9. The method of claim 8, wherein the mass of the metal oxide in the first mixture powder is less than one tenth of the mass of tin oxide and/or zinc oxide forming the first mixture powder.

10. The method of claim 9, wherein the second mixture by weight is more than 85 percent silver.

11. The method of claim 10, wherein the heating of the second mixture is by sintering, melting or extruding.

* * * * *